United States Patent [19]

Terry

[11] 3,927,632
[45] Dec. 23, 1975

[54] METHOD OF DETERMINING WATERTIGHT INTEGRITY IN HOVERCRAFT

[75] Inventor: Michael R. Terry, Mercer Island, Wash.

[73] Assignee: The United States of America as represented by the Secretary of the Navy, Washington, D.C.

[22] Filed: Feb. 26, 1974

[21] Appl. No.: 446,062

[52] U.S. Cl. .................................. 114/67 A; 73/40
[51] Int. Cl.² .......................................... B63B 1/38
[58] Field of Search ............ 114/67 A; 73/40, 49.2, 73/49.3; 340/240, 242

[56] References Cited
UNITED STATES PATENTS

| | | | |
|---|---|---|---|
| 1,398,792 | 11/1921 | Paulin | 340/240 UX |
| 3,520,381 | 7/1970 | Pinder | 73/40 X |
| 3,671,954 | 6/1972 | Clay | 340/240 |

Primary Examiner—Duane A. Reger
Assistant Examiner—Gregory W. O'Connor
Attorney, Agent, or Firm—R. S. Sciascia; Q. E. Hodges; McGiehan D.

[57] ABSTRACT

A method of determining the watertight integrity of the floatation hull of air cushion vehicles, ground effect machines, and hovercraft by measuring the differential air pressure between the air pressure in the hull or individual airtight floatation compartments during operation of the vehicle and the air pressure in the static condition. Under normal operating conditions, the compartment air pressure-atmospheric pressure differential is the same as when the vehicle is static.

If a leak occurs in the hull, the cushion air pressure, higher than atmospheric, will enter the hull or compartment causing therein a rise in pressure above atmospheric, detectable on differential pressure gauges. Continuous surveillance may be maintained by relaying the information to an annunciator or alarm system at a control station.

1 Claim, 1 Drawing Figure

U.S. Patent    Dec. 23, 1975    3,927,632
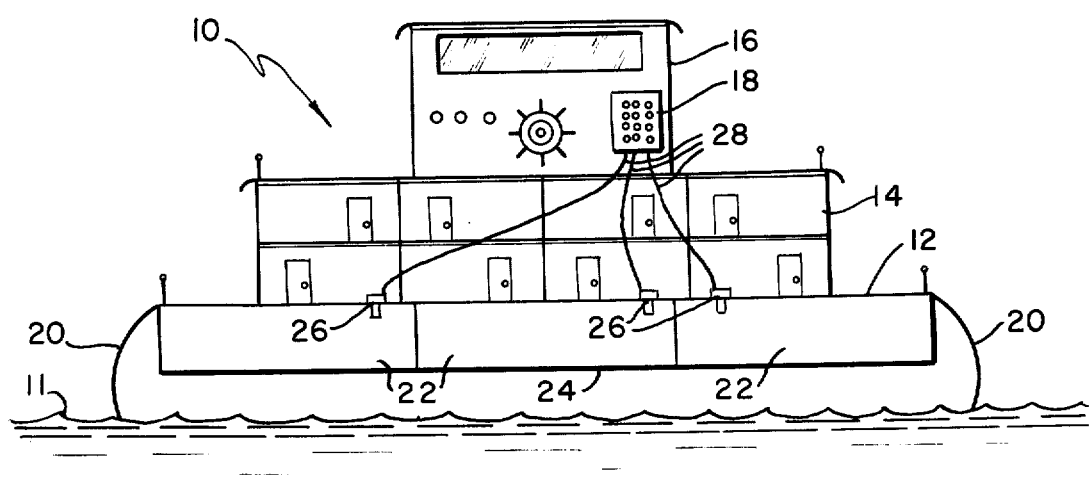

METHOD OF DETERMINING WATERTIGHT INTEGRITY IN HOVERCRAFT

BACKGROUND OF THE INVENTION

The instant invention relates generally to watertight integrity of ships and more particularly to a method of determining the watertight integrity of hovercraft and other air cushion vehicles while in operation.

Hovercraft operated over water generally have a watertight hull on which the vehicle floats when not being operated on its cushion of air. The hull is usually compartmented to preclude water from flooding the entire hull if the hull is ruptured or penetrated at any one point. If the hull is ruptured, as on a rock or by debris, during a journey on the air cushion, the condition likely would not be detected until the vehicle's hull came to rest on the water, when the hull or a compartment would flood, possibly sinking the vehicle.

It has been suggested to fill the compartments with a floatation foam such as polystyrene, however, most compartments contain equipment or at least piping and have weight limitations, so this suggestion is impractical. Current methods of testing the integrity of a plurality of compartments involve the use of liquid level gauges and sounding tapes. However, the presence of water in a compartment is not always indicative of a hull violation, but may be due to condensation or piping leaks. Because these procedures are not an accurate assay for a violation and are time consuming and cumbersome, they are often not accomplished.

Also, it is known in the art that hull compartments may be pressure tested to determine watertight integrity. These tests are performed by sealing the compartment hatches and pressurizing it with air while observing the initial pressure applied and the pressure drop over a prescribed duration. These tests are performed generally during the building and overhaul of ships and not during their operation.

SUMMARY OF THE INVENTION

Accordingly, an object of the instant invention is to provide a new and improved method of determining the watertight integrity of watercraft's hull.

Another object of the present invention is to provide a method of measuring the slight pressure differential in a hull or compartment of a hovercraft.

Still another object of the instant invention is to provide a method of determining a leak of air cushion air into the floatation hull of a hover-craft while in operation.

A further object of the instant invention is to provide a method of alerting the operator of a hovercraft of a rupture on penetration of the floatation hull and its location.

Briefly these and other objects of the instant invention are attained by use of sensitive differential air pressure detectors measuring the pressure in each of the plurality of floatation compartments normally comprising the floatation hull of hovercraft or air cushion vehicle used over the water, and comparing operating air pressure differentials with static air pressure differentials.

BRIEF DESCRIPTION OF THE DRAWINGS

A more complete understanding of the invention and many of the attendant advantages thereof will be readily appreciated as the same become better understood by reference to the following detailed description when considered in connection with the accompanying drawings wherein the FIGURE is a transverse vertical sectional view of a hovercraft having a compartmented floatation hull.

DESCRIPTION OF THE PREFERRED EMBODIMENT

Referring now to the drawing, there is shown generally in the figure a hovercraft 10 hovering "on-cushion" on a surface of water 11 having a floatation hull 12, a deck house 14 containing cabins, habitability or cargo spaces or the like, and a wheel house or bridge 16, contain a wheel, valves, gauges and controls for "conning" the hovercraft. In addition to the conventional controls an annunciator and master alarm panel 18 having an alarm, lights, and switches is provided for assessing the watertight integrity of the floatation hull 12, to be explained later in detail. The hovercraft has an air cushion skirt 20 for containment of the air cushion on which the craft rides when in operation.

Referring particularly to the pressure hull 12, it is sectioned into a plurality of watertight compartments 22, the bottoms of which form a hull bottom 24 on which the hovercraft rests when "off-cushion". Connected to each of the plurality of watertight compartments 22, is a differential pressure gauge sensor 26 that senses the air pressure in each compartment compared to atmospheric. Each sensor 26 is connected via an electric cable 28 to the annunciator and master alarm panel 18 located near the conning station on the bridge 16. The annunciator and master alarm panel has a series of lights or other indicators, one for each compartment, which are activated when the differential pressure of the associated compartment, sensed by the pressure sensor 26, is higher than the static differential pressure preset in the master alarm panel 18. In addition an audible alarm may be connected to all the sensors to alert the operator that a compartment may be ruptured.

In operation according to the novel method of this invention, it should be understood that the watertight compartments 22 of the floatation hull 12 share a common boundary, bottom 24 with the air cushion and are normally sealed and contain air at atmospheric pressure. The differential pressure gauges are placed to measure compartment pressure relative to atmospheric pressure at the top of the compartment, and normally, there will be no differential pressure indicated. But a difference in differential pressure sensed between an off-cushion and on-cushion condition indicates a leak of cushion air into the compartment through a violation of its watertight integrity.

When the hovercraft is about to commence operation and before cushion air is developed, the annunciator and master alarm panel 18 may be observed and preset to the static differential pressure from atmospheric in each of the compartments 22 whether or not there is a violation of watertight integrity. As cushion air is developed and the hovercraft goes from off-cushion to on-cushion, air pressure increases between the hull bottom 24 and the surface of the water 11. Now, if there is a violation of watertight integrity, cushion air pressure, being greater than atmospheric, will enter the violated compartment 22, increasing its pressure above atmospheric to near that of the cushion air pressure, which pressure differential will be sensed by one of the sensors 26, relayed via cables 28 to the annunciator and master alarm panel 18, where the alarm will sound and a light corresponding to the violated compartment will light. The integrity check can be accomplished as a preflight check to insure safety of flight before committing to over water operations. Steps may be immediately taken to repair the rupture to that particular compartment. Obviously, the system operates to indicate a violation of watertight integrity during hovering operations.

If a rupture is so indicated during operations as might be caused by the floatation hull 12 hitting a rock or debris during a hovering voyage, care may be taken to set the hovercraft down on the land rather than risk sinking by coming off cushion in the water. If no violation to the watertight integrity exists or occurs, then the cushion air pressure will not enter and increase the compartment pressure above atmospheric and no alarm will sound.

Obviously, many modification and variations of the present invention are possible in light of the above teachings. It is therefore to be understood that within the scope of the appended claims, the invention may be practiced otherwise than as specifically described.

What is claimed is:

1. A method of determining the water-tight integrity of a hovercraft riding on a cushion of air over a surface of water and having a static differential pressure in a compartmented floatation hull, comprising the steps of:

operating a hovercraft on-cushion by providing a volume of air under pressure between a floatation hull and a surface of water;

detecting an operating pressure differential of a compartment in said hull from atmospheric pressure;

comparing said operating pressure differential to said static differential pressure; and electrically indicating at a convenient place on said hovercraft said operating pressure differential to static pressure differential comparison;

whereby a violation of watertight integrity is indicated by cushion air pressure entering a compartment and increasing the pressure differential to above atmospheric.

* * * * *